United States Patent [19]
Craven

[11] Patent Number: 4,993,156
[45] Date of Patent: Feb. 19, 1991

[54] SPOONS AND OTHER HAND HELD UTENSILS

[75] Inventor: Mark E. Craven, Staffordshire, England

[73] Assignee: Tamworth Plastics Limited, United Kingdom

[21] Appl. No.: 399,157

[22] Filed: Aug. 28, 1989

[51] Int. Cl.$^5$ ............... B25F 3/00; A47J 43/28; G01G 19/56
[52] U.S. Cl. .................................. 30/142; 30/323; 30/324
[58] Field of Search ............... 30/321, 323, 324, 340, 30/142

[56] References Cited
U.S. PATENT DOCUMENTS

| | | | |
|---|---|---|---|
| 2,636,266 | 4/1953 | Sweet | 30/324 |
| 3,977,077 | 8/1976 | Rebold | 30/321 |
| 4,028,803 | 6/1977 | Currie | 30/324 |
| 4,389,777 | 6/1983 | Landsberger | 30/324 |
| 4,599,797 | 7/1986 | Bax | 30/323 |

FOREIGN PATENT DOCUMENTS
2136274 9/1984 United Kingdom ............... 30/324

Primary Examiner—Hien H. Phan
Assistant Examiner—Paul M. Heyrank
Attorney, Agent, or Firm—Learman & McCulloch

[57] ABSTRACT

A spoon or other like hand held implement or utensil comprises a spoon bowl (10) or other load carrying formation fixed to an inner stem (12) which also carries a pendulum weight (22). The inner stem rotates freely within a hollow outer stem (24) which is held in the user's hand and which preferably encloses the weight. In this way the spoon or the like can be used in a self-levelling mode; when the bowl is loaded and with the handle stem held horizontally or approaching horizontal the load will be retained despite any lack of mobility or skill or the part of the user (e.g. a blind or disabled person or young child) or disturbance e.g. when used on a moving ship or vehicle. A brake or other locking device (30,32) can be selectively applied to prevent said rotation and the device may also serve to open the outer stem when shifted to another position.

8 Claims, 2 Drawing Sheets

SPOONS AND OTHER HAND HELD UTENSILS

This invention relates to hand held utensils, in particular spoons and like implements for eating and culinary purposes through it is to be understood that the invention may also have application to other hand held implements such as scoops, trowels and, possibly, larger implements such as shovels, spades, garden forks and the like as well as such utensils as drinking cups.

It is known to provide spoons or forks for eating in which the spoon bowl or fork prongs are carried on a shaft which is rotatable within a handle portion and examples of such construction are described in GB No. 833889 and U.S. Pat. No. 4,559,797.

The object of the present invention is to provide hand held utensils which are particularly convenient and adaptable in use especially under adverse conditions such as when the user is subjected to the movement of a boat or other means of transport and/or where the user is under some disability of hand movement, coordination or lack of vision for example when used by young children, the elderly, the physically or meentally disabled, or the blind or partially sighted; which are of neat appearance, easily manipulated and can be readily cleaned and kept in hygienic condition According to the invention there is provided a hand held implement or other utensil comprising a spoon bowl, scoop, fork prongs or other load carrying formation fast with a longitudinal inner stem, and an outer stem serving as a handle within which the inner stem is free to rotate, characterised by a pendulum weight carried on the inner stem for urging said formation to a position of most effective load engagement or retention independently of the orientation of the outer stem about its axis, and locking means for selectively freeing or braking relative rotation of the inner and outer stems.

Preferably a substantial proportion of the weight is carried at the end of the inner stem remote from the load carrying formation.

It is also preferred that the outer stem includes a housing or enclosure within which the weight can rotate.

Conveniently the outer stem is a hollow casing which can be opened for separation of the inner stem with the weight and carrying formation, permitting thorough cleaning of the components of the utensil.

The inner stem may be arranged to rotate on low friction bearings, e.g. bearings having only small areas of frictional contact, for maximum freedom of movement in the outer stem.

A finger operated control element, e.g. a sliding catch, may be provided on the outer stem for operation of the locking means. Said element, when provided in combination with the hollow casing form of outer stem referred to above may also serve to open the latter by movement to a selected position.

An embodiment of the invention is now more particularly described with reference to the accompanying drawings wherein.

Figure 1:
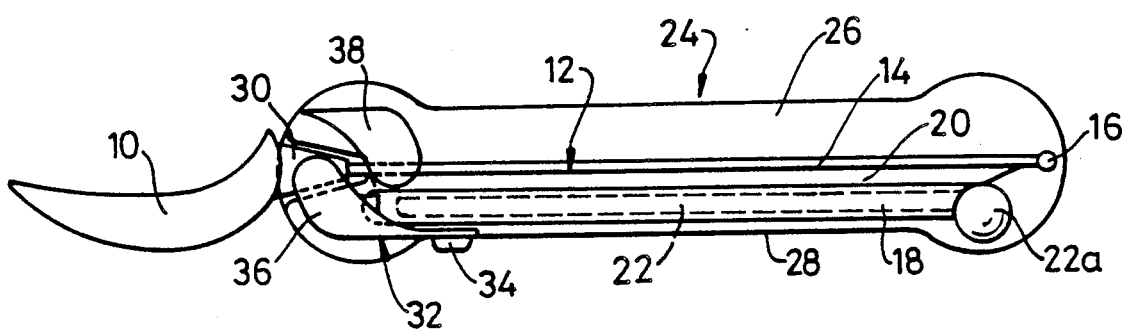
FIG. 1 is a longitudinal sectional view of a self-levelling spoon.
Figure 2:
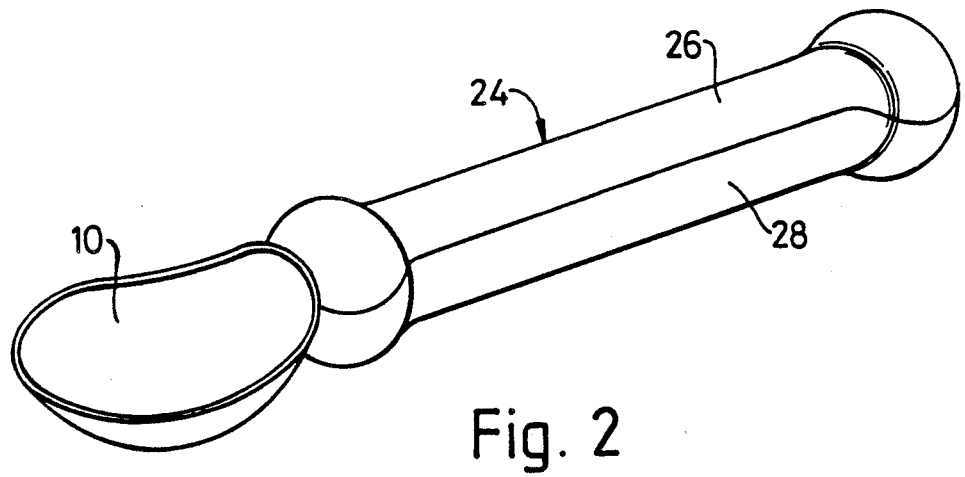
FIG. 2 is a perspective view thereof.
Figure 3A:
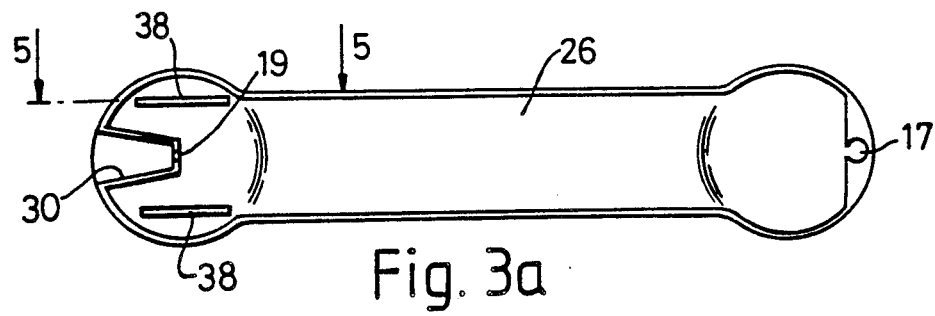
FIG. 3a is a plan view of another component.
Figure 3B:
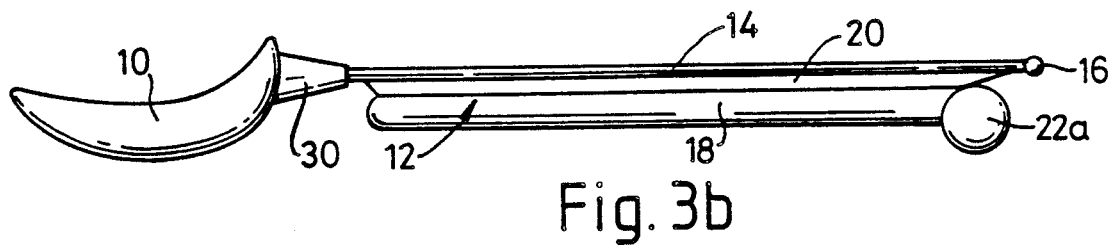
FIG. 3b is a side elevational view of another component.
Figure 3C:
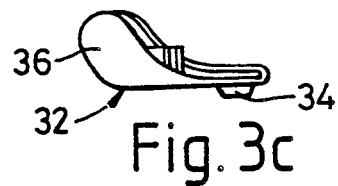
FIG. 3c is a side elevational view of another component.
Figure 3:
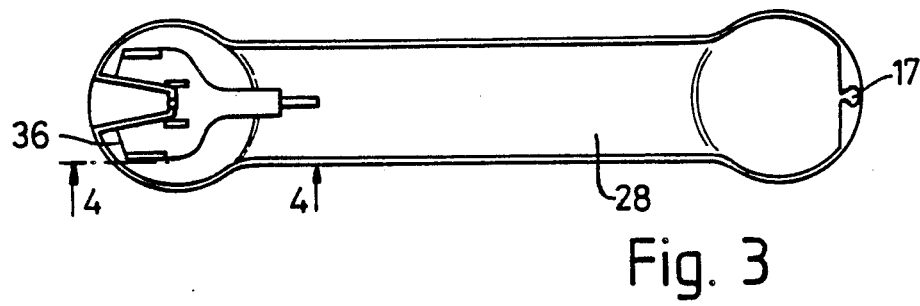
FIG. 3 is a plan view of one of the components of the spoon.
Figure 4:
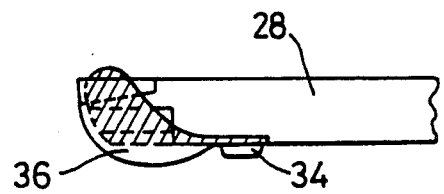
FIG. 4 is a sectional view on line 4—4 of FIG. 3.
Figure 5:
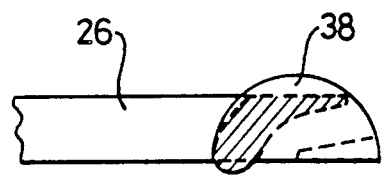
FIG. 5 is a sectional view on line 5—5 of FIG. 3.

The spoon comprises a spoon bowl 10 of generally conventional shape e.g. corresponding to a standard table spoon in capacity, or somewhat smaller if a spoon for use by a child is provided. Bowl 10 is at one end of an inner stem sub-assembly comprising an inner stem body 12 which is conveniently integral with bowl 10 e.g. being formed as a common moulding with the latter of a durable plastics material. Body 12 comprises a rectilinear shaft portion 14 extending from the inner side of bowl 10 to terminate at a small area part-spherical bearing formation 16. A tubular spine 18 of body 12 extends in spaced parallel relationship to a major part of the length of shaft portion 14 being connected thereto by a narrow web 20, said spine projecting on the same side of shaft portion 14 as the base of the bowl 10.

The inner stem sub-assembly further includes a pendulum weight 22 in the form of a metal (e.g. stainless steel) rod which is removably fitted into spine 18 and which has a bulbous part-spherical head 22a positioned, when assembled, at the end of the sub-assembly remote from bowl 10.

It will be seen that the whole of the bulk of weight 22 lies to the same side of the axis of shaft portion 14 as the bottom of bowl 10.

A tubular outer stem 24 encloses substantially the whole of the inner stem sub-assembly with the spoon in its condition of use. Outer stem 24 is formed in two halves 26, 28 split on a diametral plane, and again conveniently a pair of mouldings of a durable plastics material. The halves may be provided with interengaging formations so that they will snap-fit together.

Each end of outer stem 24 has a bulbous part-spherical shape, the end remote from bowl 10 accommodating the head 22a of weight 22 so that its rotation within the outer stem is not obstructed while the end nearest to bowl 10 accommodates other parts of the assembly referred to hereafter. This bulbous shaping also provides a user with a more positive grip on the outer stem, particularly if suffering from manual disability, e.g. arthritic hands.

When outer stem 24 is assembled in its surrounding relationship to shaft portion 14 the latter extends coaxially therewithin and is journalled for free rotation, bearing formation 16 being received in a complementary part-spherical recess 17 at the extremity of the outer stem and a short cylindrical part of shaft portion adjacent to the end of web 20 being received in a corresponding cylindrical journal formation 19 of the two outer stem halves. Between the latter and the inner side of bowl 10 shaft portion 14 is provided with a conical section 30 tapering in diameter towards the said bearing. This section substantially closes the end opening of outer stem 24 (without contact with the latter so as to minimise frictional resistance to rotation) thus resisting ingress of food, liquids or the like in use. Section 30 also serves as part of the locking or braking means now described.

Housed within the bulbous end of the lower (as viewed in the drawings) half 28 of outer stem 24 is a sliding catch 32 including a thumb button 34 lying along the exterior of the outer stem for operation while the latter is being gripped in the hand, and a bifurcated camming formation 36 enclosed within said end portion so that it is movable axially therein. The divided tips of formation 36 lie on each side of the conical section 30. When catch 32 is shifted forwardly (toward bowl 10) formation 36 comes into frictional engagement with the conical section so that relative rotation between the inner and outer stems is prevented. With the catch drawn back to an intermediate position the conical section 30 is disengaged and rotation is unobstructed.

The other half, 26 (uppermost as viewed in the drawings) includes a pair of generally parallel fixed cam formations 38 chamfered to slop downwardly and rearwardly on each side of the inner stem sub-assembly. If catch 32 is drawn back to an extreme position away from bowl 10 the tips of camming formation 36 engage cam formations 38 forcing the two halves 26, 28 apart so facilitating their disassembly for cleaning etc. With the halves released the inner stem sub-assembly can be removed and the weight 22 can be drawn out of spine 18, also the catch 32 can be lifted out of its location in outer stem half 28 enabling all the components to be thoroughly cleaned both for hygiene and to ensure that they will operate effectively and freely in use.

When the spoon is held by the handle constituted by outer stem 24 with catch 32 released and with the axis of the latter horizontal or inclined from the horizontal at up to quite a steep angle he pendulum weight 22 ensures that bowl 10 is orientated with its bottom downwards even When it is loaded to full capacity with food, liquid or other substances. Thus there is much less likelihood of spillage in transferring the load e.g. from a dish to the mouth even if the user is being subjected to movement as when travelling on a boat or in a road vehicle or aircraft and/or even if the user is not steady handed or has difficulty in manipulation due to physical or mental disability or lack of skill as in the case of young children.

The shaping and operative positioning of weight 22 provides not only the self-levelling action referred to above but also gives good balance for ease of handling (whether or not catch 32 is applied to lock the inner stem against rotation) in a longitudinal sense in that the greatest mass of weight 22 is concentrated at the end remote from bowl 10 so as to counter-balance the latter and its loading in use.

Thus the invention provides, in a particularly economical and convenient form, a spoon or the like which will be found helpful in many applications e.g. for the elderly suffering limited hand movement due to arthritic condition of the joints or other permanent disabilities; people under temporary disability e.g. having arms or hands in splints or plaster after injury; the blind or partially sighted who have difficulty in knowing whether the spoon bowl or the like is upright particularly when dealing with liquids; for small infants while learning to use a spoon; and even for normal use in adverse conditions as when travelling, on picnics etc.

While a spoon has been described above it is to be understood that other implements such as forks for eating or other uses, scoops, trowels, drinking cups and possibly larger tools or other implements such as spades, shovels and the like could incorporate the invention. The facility for selectively locking the inner stem against rotation renders the spoon or other utensil particularly adaptable e.g. using the edge of the spoon to divide or scoop out poritons of relatively solid food on the plate with the stem braked and then transferring them to the mouth with the inner stem freed once more to provide the bowl 10 with its self-levelling properties.

The facility for selectively locking the inner stem against rotation may also be helpful in training young children or the disabled in the use of normal spoons and similar utensils, the subject can practice from time to time use of the spoon with the inner stem locked e.g. when eating foods which are easier to handle, but may have the inner stem freed to make use of the self-levelling facility after a period of practice and/or when encountering foods which are more difficult to handle.

I claim:

1. A hand held implement comprising an implement such as a spoon bowl, scoop, fork prongs with a longitudinal inner stem, and a co-axial outer stem serving as a handle within which the inner stem is free to rotate about an axis, characterised by a pendulum weight carried on the inner stem for urging said formation to a position of most effective load engagement or retention independently of the orientation of the outer stem about said axis, and locking means for selectively freeing or braking relative rotation of the inner and outer stems, a substantial proportion of the weight being carried at the end of the inner stem remote from the load carrying formation, and wherein the weight includes a rod removably received in a portion of the inner stem and extending in spaced parallel relationship to said axis, and a head portion constituting said substantial proportion of said weight.

2. A utensil as in claim 1 characterised in that the outer stem includes a housing within which the weight can rotate.

3. A utensil as in claim 1 characterised in that the outer stem is a hollow casing which can be opened for separation of the inner stem from the weight and load carrying formation.

4. A utensil as in claim 1 characterised in that the inner stem is arranged to rotate on low friction bearings.

5. A utensil as in claim 1 characterised in that the locking means is operated by a finger operated control element provided on the outer stem.

6. A utensil as in clain 5 characterised in that said control element also serves to open the outer stem by movement to a selected position.

7. A utensil as in claim 1 characterised in that the outer stem has bulbous end portions.

8. A utensil as in claim 1 characterised in that the inner and outer stems and the weight are separable from each other to facilitate cleaning.

* * * * *